US012728554B2

(12) United States Patent
Wetter et al.

(10) Patent No.: US 12,728,554 B2
(45) Date of Patent: Sep. 8, 2026

(54) DRIVE UNIT FOR PRODUCT HOLD-DOWN ELEMENT

(71) Applicant: Weber Food Technology GmbH, Breidenbach (DE)

(72) Inventors: Denise Wetter, Angelburg (DE); Christian Baumeister, Mudersbach-Birken (DE)

(73) Assignee: Weber Food Technology SE & Co. KG, Breidenbach (DE)

(*) Notice: Subject to any disclaimer, the term of this patent is extended or adjusted under 35 U.S.C. 154(b) by 137 days.

(21) Appl. No.: 18/566,767

(22) PCT Filed: Jul. 6, 2022

(86) PCT No.: PCT/EP2022/068762
§ 371 (c)(1),
(2) Date: Dec. 4, 2023

(87) PCT Pub. No.: WO2023/280930
PCT Pub. Date: Jan. 12, 2023

(65) Prior Publication Data

US 2024/0269879 A1 Aug. 15, 2024

(30) Foreign Application Priority Data

Jul. 6, 2021 (EP) .................................... 21184010

(51) Int. Cl.
*B26D 7/06* (2006.01)

(52) U.S. Cl.
CPC .......... *B26D 7/0633* (2013.01); *B26D 7/0683* (2013.01); *B26D 2210/02* (2013.01)

(58) Field of Classification Search
CPC .. B26D 7/0633; B26D 7/0625; B26D 7/0683; B26D 2210/02
(Continued)

(56) References Cited

U.S. PATENT DOCUMENTS

| | | | |
|---|---|---|---|
| 9,950,869 | B1 | 4/2018 | Pryor et al. |
| 2008/0016999 | A1 | 1/2008 | Mathues et al. |
| 2013/0008133 | A1 | 1/2013 | Negele |

FOREIGN PATENT DOCUMENTS

| | | | |
|---|---|---|---|
| CN | 102079097 A * | 6/2011 | ......... A22C 17/0033 |
| CN | 108687377 A | 10/2018 | |

(Continued)

OTHER PUBLICATIONS

DE-102008020248-B4, Translation (Year: 2025).*
(Continued)

*Primary Examiner* — Nhat Chieu Q Do
(74) *Attorney, Agent, or Firm* — Erise IP, P.A.

(57) ABSTRACT

A food processing line including a food cutting machine and a drive unit for a product hold-down element of the food cutting machine is disclosed. The drive unit may be utilized to drive a transport means of the product hold-down element. The drive unit may comprise a driveshaft, a gearbox having a gearbox housing with a first and a second side, a motor, and a torque support. A method for manufacturing the drive unit corresponding to the product hold-down element of the food processing line may comprise connecting the drive shaft and the motor to the gearbox such that a rotation of the motor is transmitted to the drive shaft by means of the gearbox. The drive shaft and the motor may be connected to the gearbox on the first side of the gearbox housing. The gearbox housing may be mounted on the torque support on the second side.

10 Claims, 4 Drawing Sheets

(58) Field of Classification Search
USPC ............................................................ 83/78
See application file for complete search history.

(56) References Cited

FOREIGN PATENT DOCUMENTS

| | | | | |
|---|---|---|---|---|
| DE | 4109116 | C1 | 4/1992 | |
| DE | 102008020248 | B4 * | 4/2018 | ............... B26D 7/01 |
| WO | 2010011237 | A1 | 1/2010 | |
| WO | 2023280930 | A1 | 1/2023 | |

OTHER PUBLICATIONS

CN-102079097-A, Translation (Year: 2025).*
PCT Patent Application PCT/EP2022/068762 International Search Report and Written Opinion dated Aug. 2, 2022.

* cited by examiner

DRIVE UNIT FOR PRODUCT HOLD-DOWN ELEMENT

RELATED APPLICATION

The present application is a national stage application under 35 U.S.C. § 371 of International Application No. PCT/EP2022/068762, filed Jul. 6, 2022, which claims priority to European Patent Application No. 21184010.3, filed Jul. 6, 2021. The above referenced applications are hereby incorporated by reference.

BACKGROUND OF THE INVENTION

The present invention relates to a drive unit for a product hold-down element, a product hold-down element including the drive unit, a food cutting machine including the product hold-down element, a food processing line, and a method of manufacturing a drive unit.

Food cutting machines usually have a product feeder that feeds a food product, for example an elongated cheese loaf or a sausage, to a slicing blade. For this purpose, the food product is usually guided on a product support in the form of a conveyor belt, whereby a product hold-down element may press on the food product from above in order to achieve an exact feed. The product hold-down element also includes a drivable conveyor belt, which is in contact with the food product.

From U.S. Pat. No. 9,950,869 B1 and WO 2010/011237 A1, product hold-down elements are known that have drivable conveyor belts, for which purpose an electric motor is used, the rotation of which is transmitted by means of a toothed belt to a drive shaft of the respective conveyor belt. For this purpose, the electric motor is arranged laterally outside the extension of the drive shaft.

From US 2013/0008133 A1 a packaging machine with conveyor belts of a product support is known, in which the power transmission from the electric motor to the drive shaft is affected by means of a gearbox, the electric motor and the drive shaft being located on the same side of the gearbox.

The known variants for driving a conveyor belt, in particular a product hold-down element, are technically complex, take up a relatively large amount of space or have disadvantages in terms of mechanical bearing and force dissipation.

BRIEF SUMMARY OF THE INVENTION

It is the object of the invention to provide a drive unit for a product hold-down element, which is improved in terms of its dimensions and operating characteristics, and to provide a method for manufacturing such a drive unit.

A drive unit according to the invention for a product hold-down element of a food cutting machine for driving a transport of a product hold-down element includes a drive shaft, a gearbox having a gearbox housing with a first side and a second side, a motor, and a torque support. The drive shaft is connected to the gearbox and adapted to drive a transport. The motor is connected to the gearbox such that a rotation of the motor is transmitted to the drive shaft by means of the gearbox. In this case, the drive shaft and the motor are connected to the gearbox on the first side of the gearbox housing, and the gearbox housing is mounted on the torque support on the second side.

The transport is in particular a circulating transport, for example a transport belt or a transport chain, or a transport roller. The arrangement of motor and drive shaft on the same side of the gearbox housing is particularly space-saving. The arrangement allows deflection of the rotation of the drive, i.e. the motor, in particular, by between 150° and 210°, advantageously by substantially 180°. Advantageously, all components of the drive train, i.e. in particular the motor, gearbox and drive shaft, are mounted together on the torque support via the outer, opposite second side of the gearbox housing. Consequently, the desired strength, in particular torsional strength, may be achieved. Advantageously, a higher elasticity may be made possible with respect to a tilting of the gearbox housing with respect to the normal direction of extension of the drive shaft than with respect to a torsion of the gearbox housing about the drive shaft so as not to torsionally stress the gearbox. The second side of the gearbox housing may be opposite the first side of the gearbox housing.

The gearbox may have a gearbox ratio i=1 to i=16, in particular i=8, with the input speed being translated to slow on the output side. The gearbox may be two-stage or multi-stage. In particular, an odd number of stages is provided. This allows the input and output torques to be compensated to keep the bearing torques on the torque support at a low level. However, an even number of stages may be provided as well. In this case, the torque support may be used advantageously to dissipate higher bearing torques.

The gearbox may have a mass moment of inertia related to the drive of the gearbox of $J_{ges}$ from 0.05 $kgcm^2$ to 0.5 $kgcm^2$, in particular of 0.113 $kgcm^2$. The gearbox has an angular backlash, i.e. a reversal backlash, which is smaller than a backlash between the drive shaft and the transport, and may thus make a significant contribution to improved cutting quality through a more accurate product drive during product feeding. The rapid reversal of the conveying direction as well as speed changes during the feed and/or retraction of products in the feed area of a food cutting machine may thus be managed more precisely. To protect against water ingress, the gearbox housing may be of waterproof design. The gearbox may be provided with a lubricant approved for the food sector, in particular silicone oil, polyalphaolefin (PAO) or white oil. The gearbox shafts may be supported by ball bearings, in particular deep groove ball bearings. The gearbox housing may be made of aluminum. The gearbox housing may have a length of 100 mm to 250 mm, in particular of about 166 mm, a width of 50 mm to 100 mm, in particular of about 70 mm, and a height of 50 mm to 100 mm, in particular of about 87 mm. The gearbox housing may be beveled at its corners, providing more installation clearance. The motor may be a servomotor.

Preferably, the torque support is more elastic in the axial direction of the drive shaft than in the radial direction of the drive shaft. On the one hand, this ensures sufficiently stable positioning of the gearbox with torsional strength. On the other hand, a certain elasticity is ensured in the axial direction of the drive shaft so as not to distort the gearbox. The elasticity of the torque support in the axial direction of the drive shaft is in particular at least twice as high, advantageously at least 4 times as high, as in the radial direction of the drive shaft.

In an advantageous embodiment, the torque support is flat, in particular essentially X-shaped, Y-shaped or T-shaped. The main extension surface of the torque support may extend perpendicular to the axial direction of the drive shaft and parallel to the second side of the gearbox. The stiffness of the torque support may be adjusted based on the thickness of the torque support, but also by its shape. Furthermore, the extent of the area of the torque support in length and width may be based on the position of the drive unit. As described in more detail below with reference to the figures, the torque support may be axisymmetric. However, the torque support may be asymmetrical, in particular extending in different directions to different lengths, in order to achieve a desired arrangement of the drive unit, in particular a particularly space-saving arrangement, an arrangement along an arc of a circle or according to predetermined housing dimensions. For example, the individual legs of an X-shaped, Y-shaped or T-shaped torque support may be of different lengths.

Preferably, the torque support is formed of metal, in particular metal of a thickness in the range of 0.8 to 2.0 mm. The torque support may be a metal sheet, i.e. it may have a substantially greater width and length compared to its thickness, for example in the order of a few centimeters. In particular, the metal sheet may have a thickness of 1.5 mm. Such dimensions and materials provide advantageous mechanical properties, in particular higher elasticity in the axial direction of the drive shaft than in its radial direction.

In a preferred embodiment, the gearbox housing has two or more spaced apart fastening means for connecting to the torque support so that the gearbox housing may be positioned in at least two different relative positions to the torque support. The fastening means may be, for example, a screw receptacle or a group of screw receptacles with internal threads for fastening the torque support to the gearbox housing by means of a screw connection. Different positioning of the gearbox housing relative to the torque support, and thus of the drive shaft and motor relative to the torque support, may be achieved by connecting a torque support of a specific shape to one of the two or more fastening means. Further, different shapes of torque supports may be used to achieve different positioning of the gearbox housing relative to the torque support using one or more fasteners. Similarly, an asymmetrical torque support may be inverted or rotated to provide another positioning option for the gearbox housing. In particular, the fastening means are provided in the region of the second side of the gearbox housing. However, they may be provided elsewhere on the gearbox housing as well.

Thus, the gearbox housing may be arranged depending on the spatial constraints, for example due to a housing. In particular, a standardized drive unit may be provided for use in different machine types, whereby different spatial constraints due to the machine types are taken into account in the shape and arrangement of the torque supports used. Thus, a simple standardized production of drive units is possible, in which only different shapes of torque supports have to be manufactured to correspond to different machine types. However, the torque supports may be readily and inexpensively manufactured from metal sheets, for example by punching or laser cutting.

In a further advantageous variant, the drive shaft may be connected to the gearbox by means of a plug-in connection. This results in a particularly simple assembly. In addition, prefabricated motor and gearbox units, so-called motor gearbox units, may be connected to the drive shaft particularly efficiently.

Preferably, a toothed sleeve is arranged on the drive shaft, which is displaceable and may be clamped to the drive shaft by means of an annular clamping element. The sleeve rotates due to the rotation of the drive shaft and is provided for engagement with a rotating transport, which may in particular be a toothed belt, in order to drive the latter. The sleeve may thus be freely positioned on the drive shaft and the drive unit may be adapted to the requirements of different types of machines. In particular, multi-track product hold-down elements may be manufactured with correspondingly several drive units, whereby the sleeve only has to be shifted to the respective track position in order to drive the corresponding transport. Instead of toothed belts, other transport belts such as flat belts or V-belts may be used and the sleeve may have the matching surface structure.

In another variant, the torque support is attached to a frame element. The frame element may be part of the drive unit and be provided, for example, as a support for the installation of the drive unit in the product hold-down element. Alternatively, the frame element may be part of a product hold-down element or a frame of a food cutting machine. The frame element provides for the dissipation of forces applied to the torque support, in particular torque or weight force of the gearbox, the motor and the drive shaft. The torque support and frame element may be connected by a screw connection.

In one practical variant, the motor, the gearbox, and the torque support are enclosed by means of a housing. This protects the components from contamination and splash water when cleaning the food cutting machine. The housing may have an openable cover, thereby providing an opening, thereby allowing access to the interior of the housing and maintenance or replacement of the components. Due to the opening of the housing and the compact design of the components, the plug connections of the electric motors in particular are easily accessible. At the point of contact between the cover and the rest of the housing, a seal is expediently provided.

Preferably, the housing has a sealed feedthrough opening, through which the drive shaft is passed. Thus, the drive shaft may drive a transport of the product hold-down element outside the housing, and the components inside the housing, i.e. gearbox and motor, are protected from dirt and splash water.

Preferably, the drive unit has two or more drive shafts, each of which is connected to a respective gearbox, each gearbox being connected to a respective motor so that rotation of the motor is transmitted to the respective gearbox and the respective drive shaft, the drive shafts being arranged substantially along an arc of a circle. The product hold-down element may thus have multiple tracks, and because of the arrangement, the drive units and the other components of the product hold-down element may be identical in construction. In particular, all circulating transports may be of the same length. For this purpose, a deflection roller of a carrier frame, which may be provided per track in a product hold-down element and serve to guide the circulating transports, may be aligned with those of the other carrier frames along an axis. Thus, several food products may be conveyed side by side or several carrier frames and thus transports may be provided for one food product.

It is useful that the respective torque supports, on which the respective gearbox housings are mounted, may have a different shape from the other torque supports. In this way, the respective individual position of the gearbox, for example along an arc, may be realized. Additionally or alternatively, the torque supports may each be connected to differently positioned fastening means of the gearbox housing.

In one embodiment, the drive unit has a second frame element, on which the drive shaft is mounted. The drive shaft may be connected to the second frame element with its side opposite the gearbox in the axial direction. Thus, the drive shaft is also stably mounted at its two ends. The drive unit may also have a holm that connects the first frame element, to which the torque support is attached, and the second frame element. This provides additional mechanical stability for the drive unit. The holm may be in the form of a round tube, an edge tube, an edge profile, a flat strut or the like. The holm may be provided to anchor a support frame of the product hold-down element. The holm may have a scale that serves as a positioning guide for the carrier frames and the sleeves of the drive shafts. In addition, a strut may be provided that is connected to the first and second frame elements and serves as a further support for the carrier frames.

A product hold-down element according to the invention includes a drive unit according to one of the embodiments described above, a carrier frame, and a transport, wherein the transport is supported in the carrier frame, and wherein the carrier frame is supported on the drive unit by means of a strut. The product hold-down element is lowered in operation to such an extent that the transport presses on the food product from above with a desired force. The transport is in particular a circulating transport, for example a transport belt or a transport chain, or a transport roller. The driven transport assists in conveying the food product in the direction of the cutting blade. The circulating transport may be guided over deflection rollers of the carrier frame and over the sleeve of the drive shaft of the drive unit to be driven by the drive shaft.

A food cutting machine according to the invention includes a product hold-down element and a cutting blade for slicing a food product.

A food processing line according to the invention includes a food cutting machine and at least one upstream food product conveying device and/or at least one downstream food portioning device.

A method of manufacturing a drive unit according to the invention includes the following method steps:

- connecting a motor to a gearbox on a first side of a gearbox housing to form a motor gearbox unit;
- connecting the motor gearbox unit to a drive shaft at the first side of the gearbox housing; and
- connecting a second side of the gearbox housing to a torque support.

The process steps may be carried out in particular in the aforementioned sequence.

This means that prefabricated motor gearbox units may be kept in stock and readily installed on site. The motor gearbox units are uniform and may be used for different machine types. The respective geometry of the machine types may then be taken into account, for example, by selecting the suitably shaped torque supports.

BRIEF DESCRIPTION OF THE DRAWINGS

In the following, embodiments of the invention are described in more detail with reference to the figures. In the figures

Throughout the figures corresponding components are marked with the same reference signs.

DETAILED DESCRIPTION OF THE INVENTION

Figure 1:
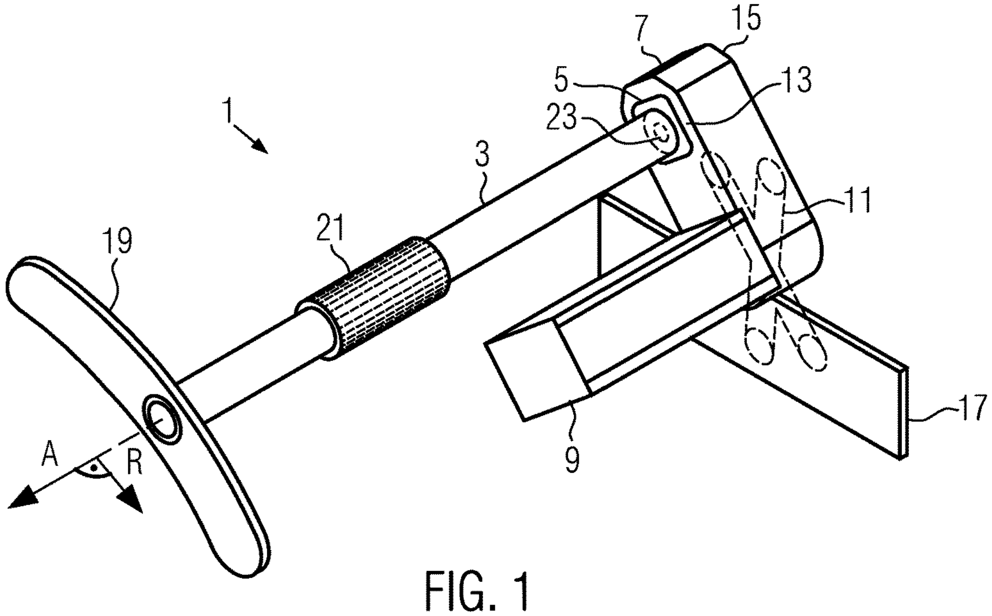
FIG. 1: is a perspective view of a first embodiment of a drive unit.

FIG. 1 shows a drive unit 1 with a drive shaft 3, a gearbox 5 encapsulated in a gearbox housing 7, a motor 9 and a torque support 11. The drive shaft 3 and the motor 9 are connected to the gearbox 5 at a first side 13 of the gearbox housing 7. The torque support 11 is connected at a second side 15 of the gearbox housing 7. In this view, the second side 15 of the gearbox housing is facing away from the viewer, so that the torque support 11 is hidden by the gearbox housing 7 and is shown here in dashed lines. The torque support 11 is X-shaped and is connected at its lower end to a first frame element 17. On the side of the drive shaft 3 opposite the gearbox housing 7, the drive shaft is rotatably mounted on a second frame element 19 in this illustration. A sleeve 21, which may for example be a toothed sleeve 21, is arranged on the drive shaft 3 and is provided for driving a transport in the form of a transport belt of a product hold-down element on the basis of the rotation of the drive shaft 3. The first frame element 17 may be part of the drive unit, of a product hold-down element or may be another frame component of a food cutting machine. The drive shaft 3 is connected to the gearbox 5 by means of a plug-in connection 23. In its longest extension, the drive shaft 3 defines its axial direction A. Its radial direction R is defined so as to be perpendicular to the axial direction A.

Figure 2:
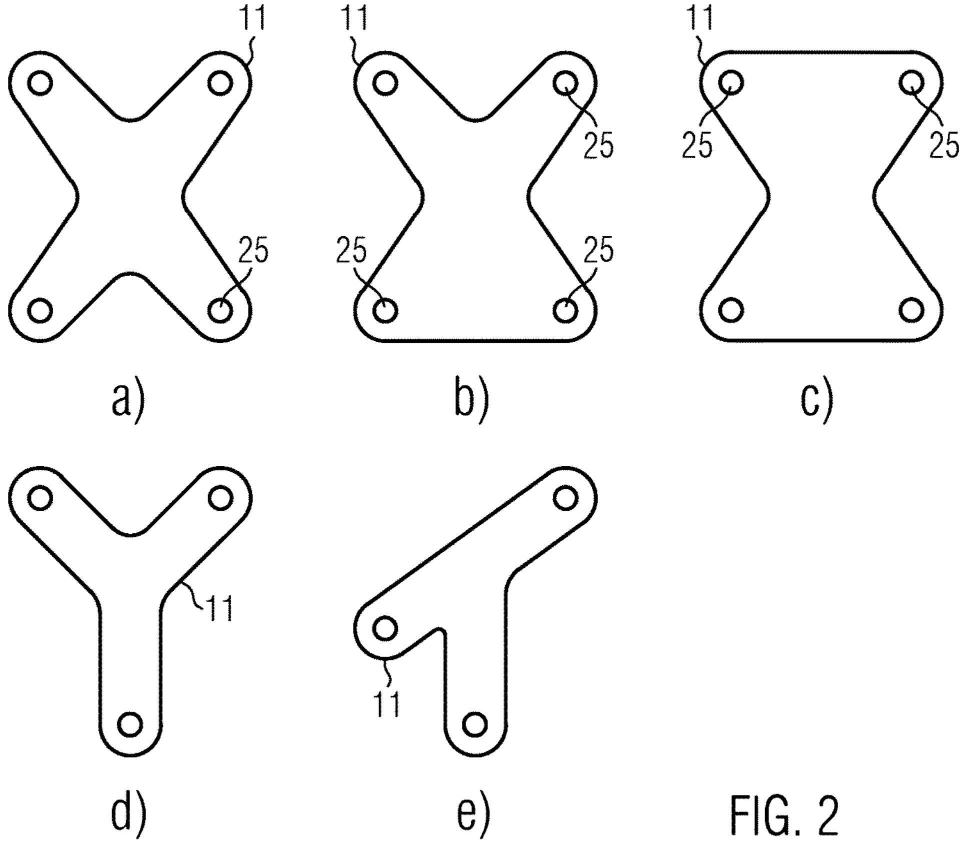
FIG. 2: is a schematic view of torque supports in different shapes.

FIG. 2 shows a schematic view of torque supports 11 in various shapes. The torque supports 11 are essentially all planar in shape, i.e., their extent in length and width, which are here in the drawing plane, is significantly greater than their thickness, which is here perpendicular to the drawing plane. Variants a), b), and c) are essentially X-shaped, with different areas of material left out. Variant d) is Y-shaped, and variant e) is T-shaped, with the top bar being sloped. The torque supports 11 may have holes 25 to be connected to fasteners of the gearbox housing 7 by means of a threaded connection.

Figure 3:
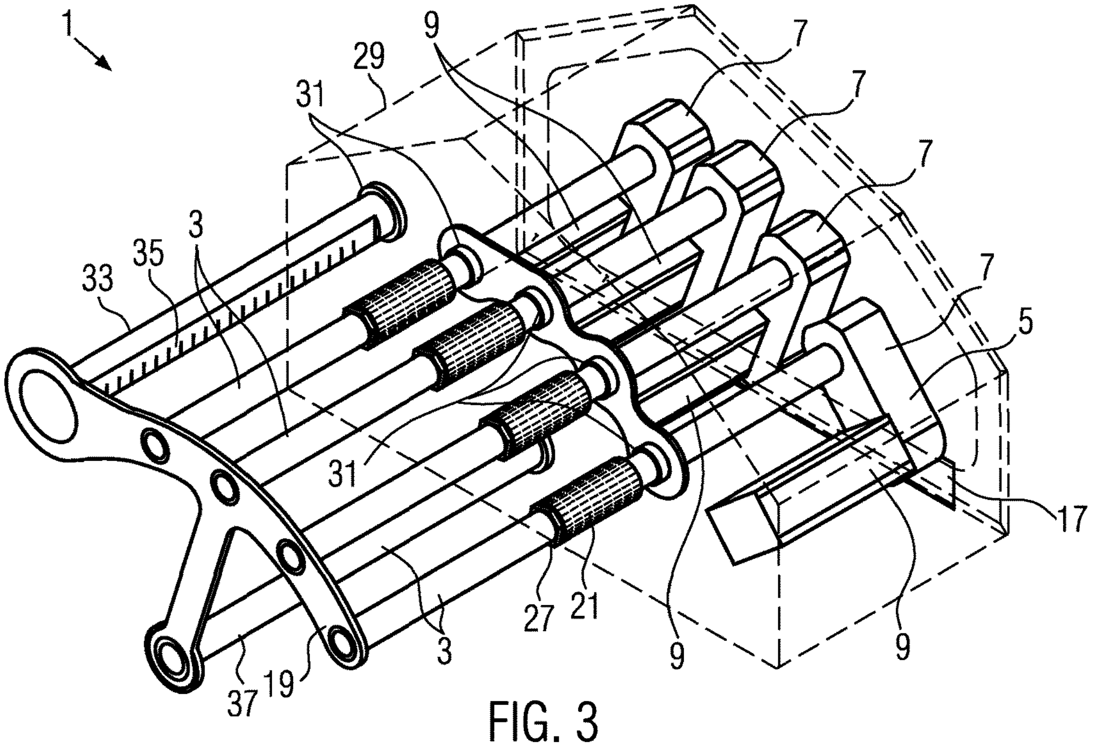
FIG. 3: is a perspective view of a second embodiment of a drive unit with housing.

FIG. 3 shows a perspective view of a second embodiment of a drive unit 1, which includes four drive shafts 3, each of which is driven by a motor 9 by means of its own gearbox 5 in order to drive a respective transport belt. The sleeves 21 are all still in a position arranged on the right, but may be moved to drive the transport belt of the corresponding track. Ring clamping elements 27 are used to fix the sleeves 21 in their respective positions on the drive shaft 3. The motors 9, gearboxes 5 or gearbox housings 7, and a section of the drive shafts 3 are enclosed by a housing 29. The housing 29 has feedthrough openings 31, through which the drive shafts 3 are passed. The feedthrough openings 31 are designed to be watertight. A holm 33 connects the first frame element 17 and the second frame element 19 and thus provides additional stability to the drive unit 1 or serves for further mounting of support frames as well as an attachment of the drive unit 1 in a product hold-down element. The holm 33, in the form of a tubular support, has a scale 35 to facilitate positioning of support frames or sleeves 21. A strut 37 serves to further support carrier frames.

Figure 4:
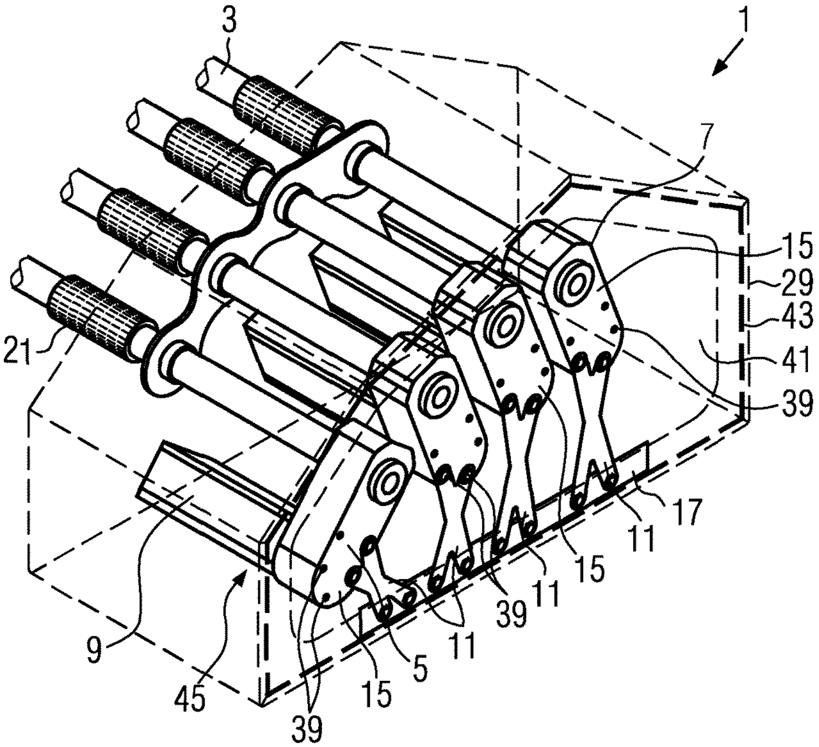
FIG. 4: is another perspective view of the second embodiment of the drive unit.

FIG. 4 shows a perspective view of the second embodiment of the drive unit 1 with four drive shafts 3 with the viewing angle being on the second sides 15 of the gearbox housings 7, i.e. from a right-hand side. In order to make the arrangement and in particular the housing 29 as space-saving as possible, the gearbox housings 7 are arranged in partially different orientations. In this way, a smallest possible housing 29 may be filled particularly advantageously. For this purpose, the torque supports 11 are formed in different sizes and shapes and are partially connected to the gearbox housing 7 at different fastening means 39 of the gearbox housing 7. The torque supports 11 are attached to the first frame element 17. In this example, the housing 29 includes an access opening 41 to allow access to components located within the housing 29. A cover 43, shown here as a dashed line, closes the access opening 41 in a watertight and reversible manner. For this purpose, it may be in the form of a door, flap or completely removable cover with correspondingly suitable connecting or retaining elements. A motor 9 and a gearbox 5 in combination form a motor gearbox unit 45.

Figure 5:
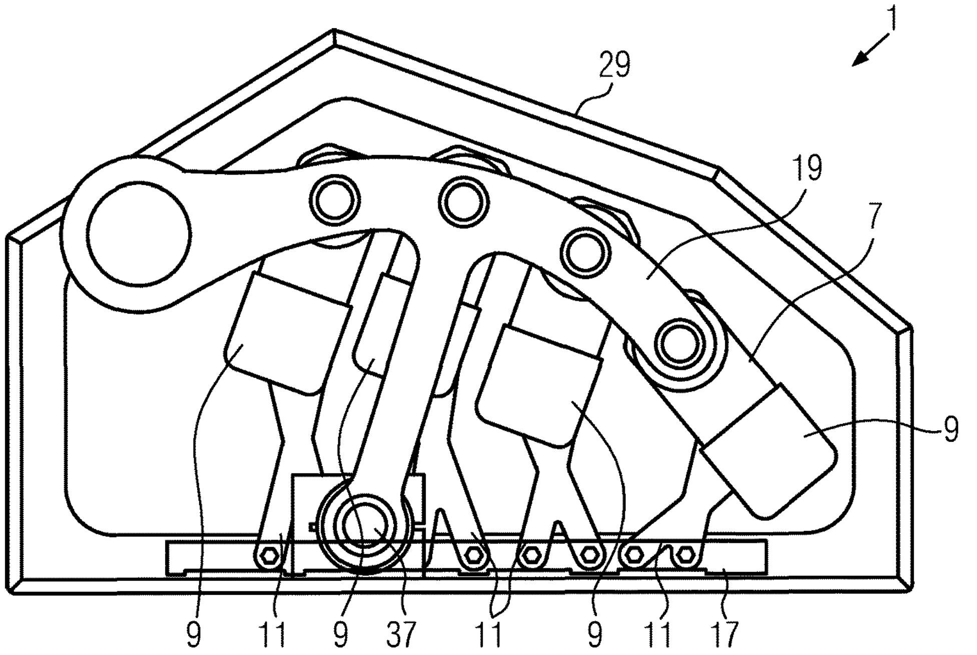
FIG. 5: is a side view of the second embodiment of the drive unit.

FIG. 5 shows a side view of the second embodiment according to FIG. 3, looking from the left at the second frame element 19. In this perspective, it is particularly evident how the drive shafts 3 are arranged around the axis of the strut 37, the housing 29 with its shape essentially following this arrangement, and the motors 9 and gearbox housing 7 are space-savingly arranged in the housing 29.

Figure 6:
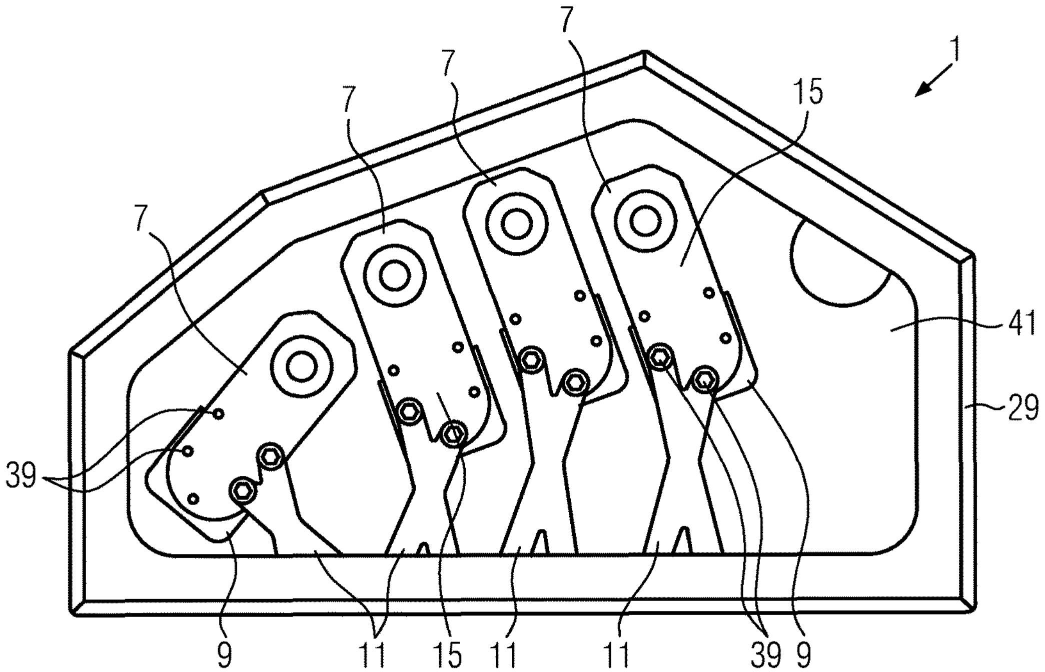
FIG. 6: is another side view of the second embodiment of the drive unit.

FIG. 6 shows a side view of the second embodiment according to FIG. 3, looking from the right at the housing 29 or the torque supports 11 and gearbox housings 7. It is evident that each torque support 11 has an individual size and shape. In this way, the respective position of the drive shafts 3 can be met and the torque supports 11 may be attached to a common, straight first frame element 17. It is evident that the position of the gearbox housings 7 are conditioned by the size and shape of the torque supports 11 themselves, as well as by the attachment to different fastening means 39 of the second side 15 of the gearbox housings 7.

Figure 7:
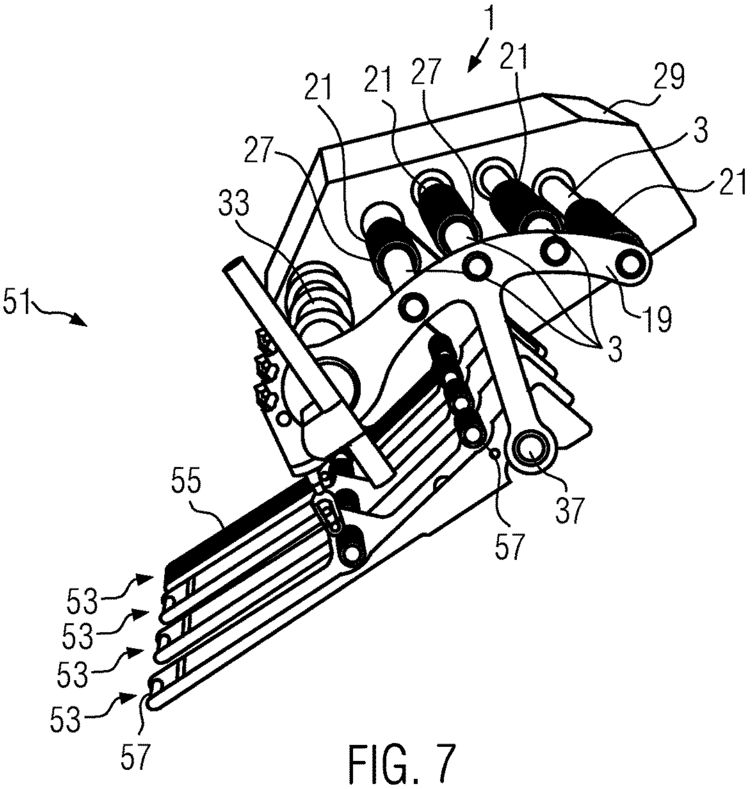
FIG. 7: is a perspective view of a product hold-down element.

FIG. 7 shows a perspective view of a product hold-down element 51 with a drive unit 1 including four drive shafts 3. Four carrier frames 53 are mounted on the strut 37 and the holm 33, in each of which a transport 55 in the form of a transport belt is guided, of which only the transport belt 55 of the rearmost carrier frame 53 seen in the direction of view is shown. The transport belts 55 are guided over deflection rollers 57 of the carrier frames 53 and the sleeve 21 of the drive shaft 3. For this purpose, the sleeves 21 are pushed to the respective track position and fixed there by means of a ring tensioning element 27. Toothed sleeves 21 may be used, for example, which engage with a transport belt 55 in the form of a toothed belt. The holm 33 may also be used to attach the product hold-down element 51 in a food cutting machine.

Figure 8:
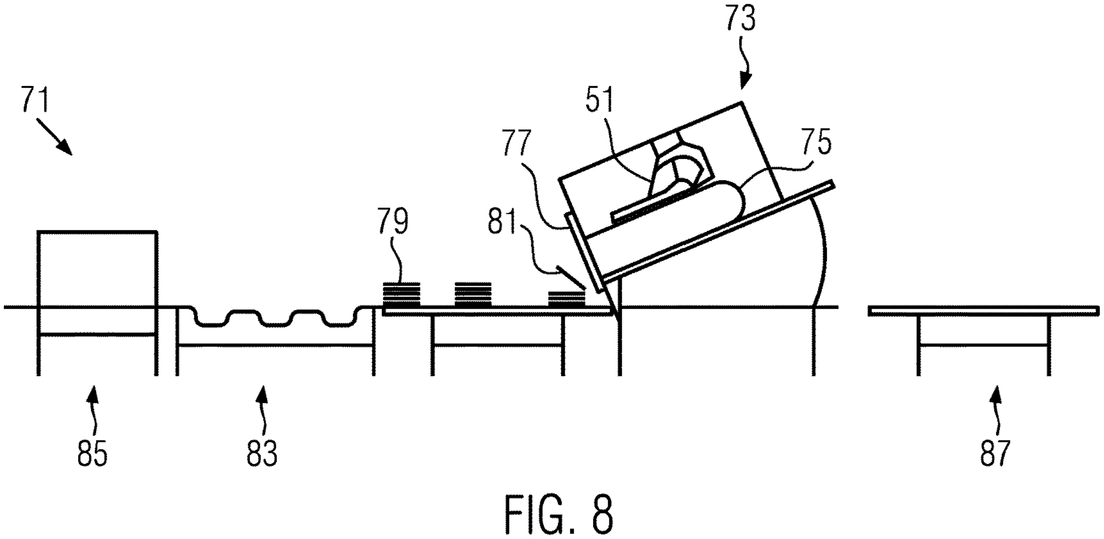
FIG. 8: is a schematic view of a food processing line including a food cutting machine with product hold-down element.

FIG. 8 shows a schematic view of a food processing line 71 including a food cutting machine 73. The food cutting machine 73 includes a product hold-down element 51 for controllably feeding a food product 75, such as an elongated sausage or cheese loaf, to a slicing blade 77. Stacks 79 of slices 81 of the food product are conveyed to a food portioning device 83 and inserted, for example, into packaging trays. An insertion robot or a suitably arranged conveyor belt may be used for this purpose. In a sealing machine 85, the filled packaging trays are sealed airtight. A food product conveyor 87 is located upstream of the food cutting machine 73 and feeds the food product 75 to it.

The invention claimed is:

1. A food cutting machine comprising:
- a slicing blade for cutting a food product; and
- a product hold-down element, comprising:
  - a drive unit comprising:
    - a drive shaft;
    - a gearbox having a gearbox housing with a first side and a second side;
    - a motor; and
    - a torque support,
    - wherein the motor, the gearbox, and the torque support are enclosed by a housing of the drive unit;
  - a carrier frame; and
  - a transport;
- wherein the transport is supported in the carrier frame, and
- wherein the carrier frame is supported on the drive unit by a strut, the drive unit being provided for driving the transport of the product hold-down element,
- wherein the drive shaft is connected to the gearbox and is adapted to drive the transport,
- wherein the motor is connected to the gearbox to transmit a rotation of the motor to the drive shaft by the gearbox,
- wherein the drive shaft and the motor are connected to the gearbox at the first side of the gearbox housing, and
- wherein the gearbox housing is supported at the second side on the torque support.

2. The food cutting machine of claim 1, wherein the torque support is more elastic in an axial direction (A) of the drive shaft than in a radial direction (R) of the drive shaft.

3. The food cutting machine of claim 1, wherein the torque support is flat and is one of: X-shaped, Y-shaped, or T-shaped.

4. The food cutting machine of claim 1, wherein the torque support is formed of metal and comprises a thickness in a range of 0.8 mm to 2.0 mm.

5. The food cutting machine of claim 1, wherein the gearbox housing comprises two or more spaced apart fasteners for connection to the torque support such that the gearbox housing is positionable in at least two different relative positions to the torque support.

6. The food cutting machine of claim 1, wherein the drive shaft is connectable to the gearbox by a plug-in connection.

7. The food cutting machine of claim 1, wherein a toothed sleeve is arranged on the drive shaft, the toothed sleeve being displaceable and configured to be clamped to the drive shaft by an annular clamping element.

8. The food cutting machine of claim 1, wherein the torque support is attached to a frame member.

9. The food cutting machine of claim 1, wherein the housing has a sealed feedthrough opening through which the drive shaft is passed.

10. The food cutting machine of claim 1, further comprising:
- at least one additional drive shaft,
- wherein each of the drive shaft and the at least one additional drive shaft is connected to a respective gearbox, each gearbox being connected to a respective motor such that rotation of the respective motor is transmitted to the respective gearbox and the respective drive shaft,
- wherein the drive shaft and the at least one additional drive shaft are arranged substantially along an arc of a circle.

* * * * *